United States Patent [19]

Park

[11] Patent Number: 4,560,614

[45] Date of Patent: Dec. 24, 1985

[54] NON-BLOCKING OPAQUE FILM

[75] Inventor: Hee C. Park, Fairport, N.Y.

[73] Assignee: Mobil Oil Corporation, New York, N.Y.

[21] Appl. No.: 683,780

[22] Filed: Dec. 19, 1984

[51] Int. Cl.[4] .......................... B32B 3/00; B32B 7/04; B32B 27/18

[52] U.S. Cl. .................. 428/317.9; 428/338; 428/409; 428/516; 428/523; 428/910; 524/451

[58] Field of Search .................. 428/317.9, 338, 352, 428/906, 330, 331, 409, 516, 523, 910; 524/451

[56] References Cited

U.S. PATENT DOCUMENTS

| | | | |
|---|---|---|---|
| 4,058,649 | 11/1977 | Steiner | 428/518 |
| 4,123,417 | 10/1978 | Finberg | 524/451 |
| 4,333,968 | 6/1982 | Nahmias | 428/516 |
| 4,377,616 | 3/1983 | Ashcraft et al. | 428/317.9 |

FOREIGN PATENT DOCUMENTS 60178  9/1982  European Pat. Off. ............ 524/451

*Primary Examiner*—William J. Van Balen
*Attorney, Agent, or Firm*—Alexander J. McKillop; Michael G. Gilman; James P. O'Sullivan, Sr.

[57] ABSTRACT

The invention involves preventing film-to-film blocking of a biaxially oriented polypropylene film which has been surface treated to enhance its wettability comprising including in said film prior to said treatment sufficient talc to prevent blocking. $TiO_2$ can also be included in the surface film to impart paper-like characteristics thereto.

6 Claims, No Drawings

NON-BLOCKING OPAQUE FILM

This invention is concerned with an opaque film structure of enhanced opacity and brightness, inhibited against film to film blocking.

BACKGROUND OF THE INVENTION

In U.S. Pat. No. 4,377,616 there is described a biaxially oriented opaque film having excellent overall characteristics. To use this material for some commercial wrapping purposes, it is necessary that the film be further modified so as to permit printing thereon and to permit the heat sealing or adhesive sealing of the film to itself or other surfaces. In order to prepare the surfaces of polymeric films for ink receptivity or the adhesion of glues and adhesives, it is a common practice to treat the surface of the film to enhance the wettability of these materials. Common techniques employed to increase the wettability of such materials, such as, polypropylene, include corona discharge treatment and flame treatment. In the case of the subject films, however, it has been found that such treatment leads to destructive film-to-film blocking.

It is an object of the present invention to modify films of this type so that in spite of treatment to enhance the wettability of a film surface, the films still will not destructively block together.

SUMMARY OF THE INVENTION

The film structure of the present invention comprises a biaxially oriented polypropylene surface treated to enhance its wettability, said polypropylene containing sufficient finely divided talc to prevent film-to-film blocking of the treated film.

A preferred film structure of the present invention is an opaque biaxially oriented polypropylene film structure comprising:

a core thermoplastic polymer matrix material within which is located a strata of voids;

positioned at least substantially within at least a substantially number of each of said voids, is at least one spherical void-initiating solid particle which is phase distinct and incompatible with said matrix material, the void-space occupied by said particle being substantially less than the volume of said void, with one generally cross-sectional dimension of said particle at least approximating a corresponding cross-sectional dimension of said void;

void free, polypropylene skin layers adhering to the surfaces of said core layer, said skin layers containing sufficient talc to prevent film-to-film blocking when the film surface is treated to enhance its wettability. The invention is also directed to the described film in its surface treated form to enhance its wettability and also containing $TiO_2$ in its skin layers to impart paper-like characteristics thereto.

The present invention is also directed to the method of forming the subject films treated to enhance its wettability and yet still resist destructive blocking.

DETAILED DESCRIPTION OF THE INVENTION

The subject invention is directed to the improvement of any biaxially oriented polypropylene film or surface. As indicated above, particularly preferred polypropylene structures are those described in U.S. Pat. No. 4,377,616, the disclosure of which is incorporated by reference in its entirety herein. Generally speaking, the polypropylenes employable herein are from 80-100% isotactic and preferably from 95% to 96% isotactic.

It is the intent of the present invention that the subject films ultimately be treated in order to enhance their wettability and adhesion to other materials. While not limited thereto, corona discharge treatment and surface flame treatment are two common techniques which enhance the surface wettability, and, therefore the potential adhesion, of the surface to other materials. Unfortunately, such techniques are too successful in that it also enhances the tendency of the oriented polypropylene film surfaces to adhere to one another while in roll or sheet form. The surfaces of the oriented polypropylene may be treated in a known manner by corona discharge to about 35-60 dynes/cm., and preferably to about 35-40 dynes/cm. Alternatively the surface of the film can be flame treated by employing a Gas Flame Treating System, available from ESE CI Soc. Costruzioni Industriali, Narni, Italy. Systems of this type are described in U.S. Pat. No. 2,683,894, incorporated herein by reference in its entirety.

The talc employed in the practice of the present invention, in order to prevent the treated films from destructively blocking together, is a commercially available material. Talc chemically is $3MgO\ 4SiO_2\ H_2O$. This material is also known as talcum, soapstone, rensselaerite, potstone, steatite, and French chalk. A commercially available material which has been found successful is Cyprus Mistron ZSC Talc and it may be present in from about 1.5-8% by weight of the skin layer.

It has also been found that the paper-like characteristics of this polymeric film structure can be enhanced by the inclusion therein of titanium dioxide, i.e. $TiO_2$. A satisfactory commercially available $TiO_2$ is SCM Glidden RCL 4. By the inclusion of from about 2-8% by wt. of the skin layer of $TiO_2$ in the skin polypropylene layer, enhanced opacity and brightness is obtained.

The following examples illustrate the present invention.

EXAMPLE 1

A biaxially oriented isotactic polypropylene film of approximately 1 mil in thickness is corona discharge treated on one surface thereof to a level of 37 dyne/cm. Ink and adhesive wetout on the untreated side will be adequate, however, adhesion strengths will be extremely weak. With one side treated film, blocking as a result of rolling or stacking is not a problem, i.e. it will not destructively block. However, the adhesion strength between an adhesive coated untreated film bonded to a treated film will be weak and commercially unreliable.

EXAMPLE 2

Example 1 is repeated except that the film is corona discharge treated on both sides to a level of 37 dynes/cm. Sections of this film are stacked one upon the other and placed under a weight of 750 psi at 140° F. for a period of 1 hour. The film sections will be blocked to destruction, i.e. the films cannot be separated without tearing and distorting. This film would reliably bond via an adhesive to another treated surface. However, the blocking problem must be solved.

EXAMPLE 3

Example 2 is repeated except that the isotactic polypropylene film contains 2% by wt. of talc (Cyprus Mistron ZSC Talc). Ink and adhesive wetout are excellent; and printing quality and adhesive strength between bonded films will be excellent. No film to film blocking will occur under the same conditions as in Example 2.

EXAMPLE 4

A mixture of isotactic polypropylene (93 parts, melting point 60° C. and a melt flow rate of 4.5), nylon-6 (5 parts, melting point 225° C.) and $TiO_2$ (2parts) were melted in an extruder provided with a screw of a L/D ratio of 20/1. A second extruder was in association with this first mentioned extruder and supplied with the same polypropylene without nylon and $TiO_2$ present. A melt coextrusion was carried out while maintaining the extrusion cylinder of the core material at a temperature ranging from 190° C. to 220° C. The polypropylene extruded as the skin layers, was maintained at a temperature of 220° C. A film structure was coextruded with a core thickness 70% of the total extruded thickness. The skin layers were each approximately 15% of the total thickness. The unoriented film measured approximately 40 mils in thickness. This sheet was then biaxially oriented using available tenter technology. The biaxially oriented film was the corona discharge treated on one side thereof. The resulting 1.5 mil film had an opacity of 30% transmission and a Brightness Index of 72 at infinite thickness. Ink and adhesive wetout on the untreated side was adequate, however, adhesion strengths, as in Example 1, were extremely weak. This film would have no commercial utility because of adhesive failure, i.e., weak bonding and film to film separation.

EXAMPLE 5

The process of Example 4 was repeated except that the resultant film was corona discharge treated on both sides to a level of 37 dynes/cm. Sections of the resultant film was stacked under a weight of 750 p.s.i. for a period of 1 hour at a temperature of 140° F. The treated film blocked to destruction as in Example 2.

EXAMPLE 6

The process of Example 4 was repeated except that the skin resin included 2% by weight of talc (Cyprus Mystron ZSC Talc) and 4% by weight of $TiO_2$ (SCM Glidden RCL-4 ) based on the skin layer. The resulting film structure, extruded and oriented to the same extent and under the same conditions, as the film of Example 4, has a 25% light transmission with a Brightness Index of 80. The surface reflection combined with 80 Brightner Index resembles a paper-like substance. This structure has unexpectedly high stiffness. Ink and adhesive wetout on the untreated side was adequate, however, adhesion strength was still weak and not suitable for commercial use.

EXAMPLE 7

The process of Example 6 was repeated except that the film was corona discharge treated on both sides to a level of 38–39 dynes/cm. The printing adherence and quality was excellent. The adhesion of adhesively bonded films was at least 250 g/in.

The foregoing Examples illustrate that the presence of talc prevents corona discharge treated polypropylene film from blocking to destruction. The examples also show that the inclusion in the surface layer of $TiO_2$ in combination with the talc results in a paper like feel and appearance.

A similar effect will be observed on employing flame treatment of the film instead of corona discharge treatment.

What is claimed is:

1. A non-blocking film structure comprising a biaxially oriented polypropylene film surface treated to enhance its wettability, said film containing sufficient talc to prevent film-to-film blocking of the treated film.

2. The structure of claim 1 wherein said treatment is effected by either corona discharge treatment or by flame treatment.

3. An opaque biaxially oriented polypropylene film structure comprising
   a core polypropylene matrix within which are located strata of voids;
   positioned at least substantially within at least a substantial number of each of said voids, is at least one spherical void-initiating solid particle which is phase distinct and incompatible with said matrix material, the void-space occupied by said particle being substantially less than the volume of said void, with one generally cross-sectional dimension of said particle at least approximating a corresponding cross-sectional dimension of said void; and
   void-free polypropylene skin layers adhering to the surfaces of said core layer, the surfaces of said skin layers having been treated to enhance wettability, said skin layers containing sufficient talc to prevent film-to-film blocking of the film structure after wettability of the surfaces thereof has been enhanced.

4. The film structure of claim 3 including from about 2 to 8 wt.% of $TiO_2$ in said skin layers to impart paper-like feel and appearance characteristics thereto.

5. The film structure of claim 3 wherein said wettability enhancement is accomplished by either corona discharge treatment or flame treatment.

6. The method of forming a non-blocking polypropylene film having the surfaces thereof treated to enhance wettability comprising prior to enhancing the wettability of the polypropylene film surfaces, including therein sufficient talc to prevent film-to-film blocking.

\* \* \* \* \*